Dec. 20, 1955   V. G. VAUGHAN   2,727,962
THERMOSTATIC ELEMENT AND SWITCH
Filed Aug. 4, 1954
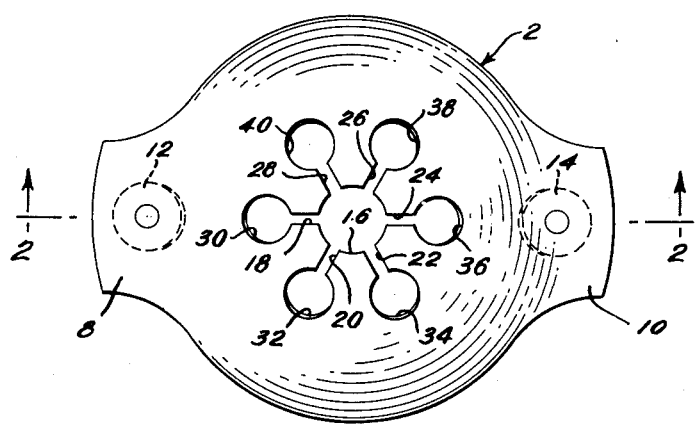
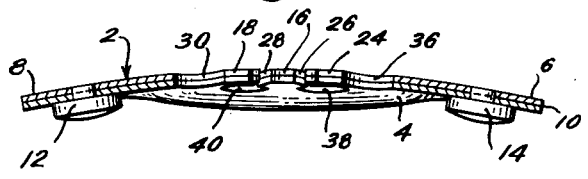
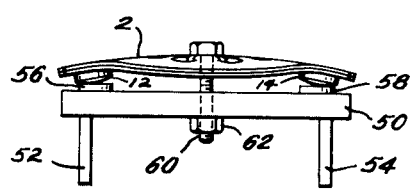
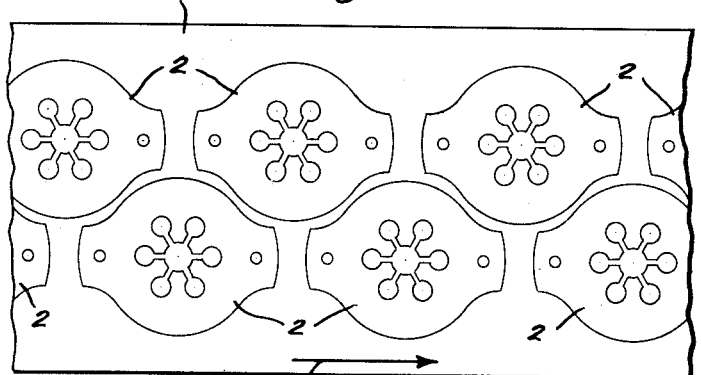
Inventor,
Victor G. Vaughan,
by Townsend M. Gunn,
Atty.

United States Patent Office 2,727,962
Patented Dec. 20, 1955

2,727,962

THERMOSTATIC ELEMENT AND SWITCH

Victor G. Vaughan, Attleboro, Mass., assignor to Metals & Controls Corporation, Attleboro, Mass., a corporation of Massachusetts Application August 4, 1954, Serial No. 447,755

10 Claims. (Cl. 200—138)

This invention relates to thermostatic snap-acting elements, and in particular to such elements that have stress-relieving means associated with them.

Among the several objects of the invention may be noted the provision of a snap-acting thermostatic element which has improved operating characteristics; the provision of an element of the above class which has a greatly increased operating life; the provision of a thermostatic switch incorporating a snap-acting element of the above class; and the provision of a snap-acting thermostatic element which is simple and economical to make. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Fig. 1 is a plan view of one embodiment of the thermostatic element of this invention;

Fig. 2 is a sectional elevation of the Fig. 1 view, taken in the direction of sight lines 2—2 thereon;

Fig. 3 is a side view of a simple thermostatic switch embodying the Fig. 1 element; and Fig. 4 is a plan view of a strip of thermostat metal having indicated thereon the orientation of several of the Fig. 1 elements, to show how the elements are to be blanked from the strip.

Similar reference characters indicate corresponding parts throughout the several views of the drawings.

In the use of inherently snap-acting thermostatic elements (for example, such as is shown in United States Letters Patent 1,448,240), whether as switch operating means or as valve movers, one of the problems encountered in some instances, is the lack of operating life. This lack of life is probably due to localized over-stressed areas, and generally manifests itself as a cracking of the metal of the element, the cracking in some cases starting at the center mounting hole and working outwardly generally in a radial direction. One of the desired features of a snap-acting thermostat element is an ability to retain at all times the temperature setting originally provided in it (one of these temperatures being the temperature at which the element snaps when hot, the other being the temperature at which the element snaps back to its original shape when cooled). The aforementioned cracking causes changes in these temperatures, and thus in the temperatures at which an electrical switch, for example, controlled by the snap-acting element, may operate.

Consequently, it is important to eliminate or decrease the occurrence or extent of this cracking at the center hole (hereinafter called "center cracking"). Two methods for relieving stress in such snap-acting plates have been presented in the past as shown in the United States Patents Nos. 1,654,320 and 1,654,519. However, while the structures suggested by these patents alleviate the above problem of cracking to some extent the relief afforded thereby does not provide sufficient life for many applications. The solution proposed by this invention goes far toward satisfying the need expressed above, and the improvement afforded over said United States Letters Patent is startling and completely unexpected.

Referring now to the drawings, there is shown in Fig. 1 a plan view of a snap-acting thermostatic element of this invention. It consists of a dished plate 2 of thermostat metal having a high expansion layer 4 and a low expansion layer 6. In the particular embodiment shown, by way of example only, ears 8 and 10 are provided in the manner shown by United States Patent 2,317,831. To these ears are attached, as by welding, the electrical contacts 12 and 14. The invention is equally applicable to snap-acting elements of other shapes, such as the round disc shown in United States Patents 2,317,830 and 1,448,240.

A center hole 16 is provided, and connected with said hole and radiating outwardly as shown, are the six slots 18, 20, 22, 24, 26 and 28. Each of these slots ends in the holes, respectively, 30, 32, 34, 36, 38 and 40. It will be observed that slots 18 and 24 (with their associated holes 30 and 36) are on a diameter which bisects the ears 8 and 10. (This same diameter is the diameter on which are welded the contacts 12 and 14, and coincides with the sight line 2—2.) On one side of this diameter are located slots 20 and 22 with their respective holes 32 and 34. These slots and holes are symmetrically arranged, the angle between slots 18, 20, 22 and 24 being each approximately 60°. Similarly, slots 26 and 28 with their holes 38 and 40 are symmetrically arranged as shown, a similar 60° angular relation being provided in respect to each other and slots 18 and 24.

It is now to be noted that, as thus provided, the respective slots and holes are symmetrically arranged with the direction in which the thermostat metal was rolled, as shown in Fig. 4. It is well known, of course, that the arrangement of the crystalline structure, or "grain" of thermostat metal caused by rolling during the process of manufacture is such that the metal exhibits properties slightly different in one direction (for example, taken in the direction of rolling) than similar properties taken in another direction (for example, across the direction of rolling). It is believed that this symmetrical arrangement as shown here is the cause of the completely unexpected long life of these thermostatic elements, since elements having asymmetrical arrangements with respect to the direction of rolling do not have such life.

Reference to Fig. 4 shows a strip of thermostat metal 44 from which are to be punched the several thermostat elements 2. Thermostat metal 44 was rolled, during the manufacture of it, in the direction indicated by the arrow 46. It is seen that the several elements are so arranged as to be symmetrical with respect to this direction.

In the above description, the angular separation of the slots is given at 60°. Of course, it is to be realized that a slight departure from this will not materially change the life of the elements. (By "life" is meant the number of operations before cracking occurs.) Consequently, in specifying a 60° relation the word "approximate" has been used.

As an example of a thermostat element that has operated satisfactorily in accordance with this invention, mention is made of a snap-acting disc substantially as shown in Fig. 1 in which the distance from the end of one ear to the end of the other was approximately one inch; the central "disc" (or dished) portion had an outside diameter of ¾ inch; central hole 16 had a diameter of approximately ⅛ inch; each of the slots was approximately .010 inch wide; and each of the holes 30–40 inclusive had a diameter of approximately .094 inch, and was centered on a radius (from the center of hole 16) of approximately .156 inch. The thermostat metal was approximately .010 inch thick. Several thermostat elements of these dimensions were tested by assembling them with contacts to make electrical switches, for example, quite similar to the structure shown in Fig. 3, and the thermostatic elements were heated by passing electric current through them until they reached their snapping temperature, at which point current was interrupted and the elements were allowed to cool down to their snapping-back temperature. The average number of cycles before cracking occurred was 24,800. Exactly the same discs, made of the same material, but without the holes and slots, were tested under similar conditions, and the average cycles before cracking was found to be 4500. Thus, this invention provided snap-acting elements having a five times longer life before cracking.

Applicant gives above the test results for one specific shape and thickness of snap-acting element. Applicant has tested many other shapes, and in all cases finds that the number of cycles that the element will undergo before cracking when the holes and slots are provided as taught by this invention, is at least four times the number of cycles that a similar element will undergo which does not have said holes and slots. In some isolated cases, the life has been as much as ten times the life of a snap-acting element without holes.

Reference to Fig. 3 shows a side view of a simple exemplary switch using the aforesaid element as the switch-actuating means. A base 50 of electrical insulating material such as Bakelite is provided through which project the terminals 52 and 54; these terminals end in turned-over heads 56 and 58 which serve as stationary contacts. Contacts 56 and 58 are positioned so as to be engaged by the movable contacts 12 and 14 carried by the snap-acting element 2, which is mounted on base 50 by means of the adjusting screw 60. As is customary, a lock nut 62 is provided to maintain the calibration setting. (The complete details and structure of such a switch as this are given in United States Patent No. 2,199,387, together with an explanation of its adjustment and operation.) Upon heating, the snap-acting element 2 reverses its curvature to lift contacts 12 and 14 from stationary contacts 56 and 58. On cooling, element 2 snaps back to the shape shown.

In the illustrated and described embodiment, ears are shown as explained above. However, the invention includes in its scope round discs without ears, as well as other shapes of inherently snap-acting thermostat elements, such as oval, and square. Furthermore, elements which do not acquire their inherent snap-acting characterstic by being centrally dished, but instead acquire it by having edge portions crimped, are likewise benefited by having the aforementioned slots and holes. These also are to be included in the scope of this invention.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. A snap-acting thermostatic element comprising a sheet of thermostat metal stressed to have an inherent bowed configuration, said sheet having a center hole and slots through the sheet beginning at said center hole and extending outward, said slots terminating at their outer ends in other holes through said sheet, said slots and said holes lying on radii separated by approximately 60° with two of said slots lying on a line parallel to the crystalline orientation of the metal.

2. A snap-acting thermostat element comprising a sheet of thermostat metal having a dished configuration, said element having a center hole and slots through the sheet beginning at the center hole and extending outwardly in a radial direction, said slots being symmetrically arranged about the center hole and ending in enlarged end portions, the angle between said slots being approximately 60°, and two of said slots lying on a line parallel to the direction in which said sheet was rolled during fabrication.

3. A snap-acting thermostatic element comprising a dished plate of thermostat metal having a portion with a non-developable curvature, said plate having two positions of inherent stability and snapping into one of said positions when heated to a predetermined temperature and snapping back to the other of said positions when thereafter cooled to a predetermined temperature, said plate being provided with a center hole and six slots through the plate and extending into said non-developable portion in radial directions, said slots being spaced 60° apart, and two of said slots lying on a line parallel to the crystalline orientation of the metal, each of said slots terminating in a hole through said element.

4. A snap-acting thermostatic element comprising a dished disc of thermostat metal having a portion with a non-developable curvature, said disc having two positions of inherent stability and snapping into one of said positions when heated to a predetermined temperature and snapping back to the other of said positions when thereafter cooled to a predetermined temperature, said disc being provided with a pair of ears attached to the perimeter of said disc diametrically opposite each other, a pair of contacts welded to said disc at said ears, and said disc being provided with a center hole and six slots through the disc and extending into said non-developable portion in radial directions, the angle between any pair of adjacent said slots being approximately 60°, and two of said slots lying on a line parallel to the crystalline orientation of the metal, each of said slots terminating in an enlarged portion through said element.

5. A snap-acting thermostatic element comprising a dished plate of thermostat metal having a portion with a non-developable curvature, said plate having two positions of inherent stability and snapping into one of said positions when heated to a predetermined temperature and snapping back to the other of said positions when thereafter cooled to a predetermined temperature, said plate being provided with a pair of ears diametrically attached to said plate, a pair of contacts, one of each being welded to said element at said ears, and said plate being provided with a center hole and six slots through the plate beginning at said center hole and extending into said non-developable hole in radial directions, the angle between any pair of adjacent slots being approximately 60°, and two of said slots lying on a line parallel to the direction in which said metal was rolled during its manufacture, said contacts also lying on said line.

6. A snap-acting thermostatic switch comprising a base of electrical insulating material, an adjusting post mounted on said base, a snap-acting thermostatic plate of thermostat metal mounted on said adjusting post, said plate having two positions of inherent stability and snapping into one of said positions when heated to a predetermined temperature and snapping back to the other of said positions when thereafter cooled to a predetermined temperature, a pair of contacts fastened to said plate and movable thereby, a pair of stationary contacts mounted on said base in position to co-operate electrically with said movable contacts, said plate being provided with a center hole and six slots through the plate, said slots beginning at said center hole and extending into said thermostatic plate in radial directions, the angle between any pair of adjacent slots being approximately 60°, and two of said slots lying on a line parallel to the crystalline orientation of said metal.

7. The snap-acting thermostatic switch of claim 6, in which each of the contacts of said pair of movable contacts is welded to the plate near the periphery thereof, is diametrically opposite the other of said pair of movable contacts, and lies on said parallel line on which said two slots lie.

8. A snap-acting thermostatic switch comprising a base of electrical insulating material, an adjusting post mounted on said base, a snap-acting thermostatic plate of thermostat metal mounted on said adjusting post by means of a hole in the center of said plate, said plate having two positions of inherent stability and snapping into one of said positions when heated to a predetermined temperature and snapping back to the other of said positions when thereafter cooled to a predetermined temperature, a pair of contacts fastened to said plate and movable thereby, a pair of stationary contacts mounted on said base in position to co-operate electrically with said movable contacts, said plate being provided with six slots through the plate, said slots beginning at said center hole, extending into said thermostatic plate in radial directions, and terminating in holes through the plate, the angle between any pair of adjacent slots being approximately 60°, and two of said slots lying on a line parallel to the crystalline orientation of said metal.

9. The snap-acting switch of claim 8, in which each of said pair of movable contacts is welded to the plate near the periphery thereof, is diametrically opposite from the other of said pair, said contacts lying on said parallel line on which said two slots lie.

10. A snap-acting thermostatic switch comprising a base of electrical insulating material, an adjusting post mounted on said base, a snap-acting thermostatic disc made of thermostat metal mounted by a center hole thereof on the top of said adjusting post, said disc being provided with a pair of ears attached to the periphery thereof at opposite ends of a diameter, said diameter being parallel to the direction in which said thermostat metal was rolled during its manufacture, each of said ears having welded thereto an electrical contact, a pair of stationary electrical contacts mounted on said base and co-operating with said contacts on the disc to make and break an electrical circuit through said disc, said disc being provided with six slots therethrough, said slots beginning at said center hole, lying on radii of said plate, and terminating in holes through the disc, the angle between any pair of adjacent slots being approximately 60°, and two of said slots lying on said diameter.

References Cited in the file of this patent

UNITED STATES PATENTS

| | | |
|---|---|---|
| 1,654,320 | Colby | Dec. 27, 1927 |
| 1,654,519 | Greenawalt | Dec. 27, 1927 |
| 1,939,286 | Spencer | Dec. 12, 1933 |
| 2,137,309 | Smulski | Nov. 22, 1938 |
| 2,299,562 | Burch | Oct. 20, 1942 |